UNITED STATES PATENT OFFICE.

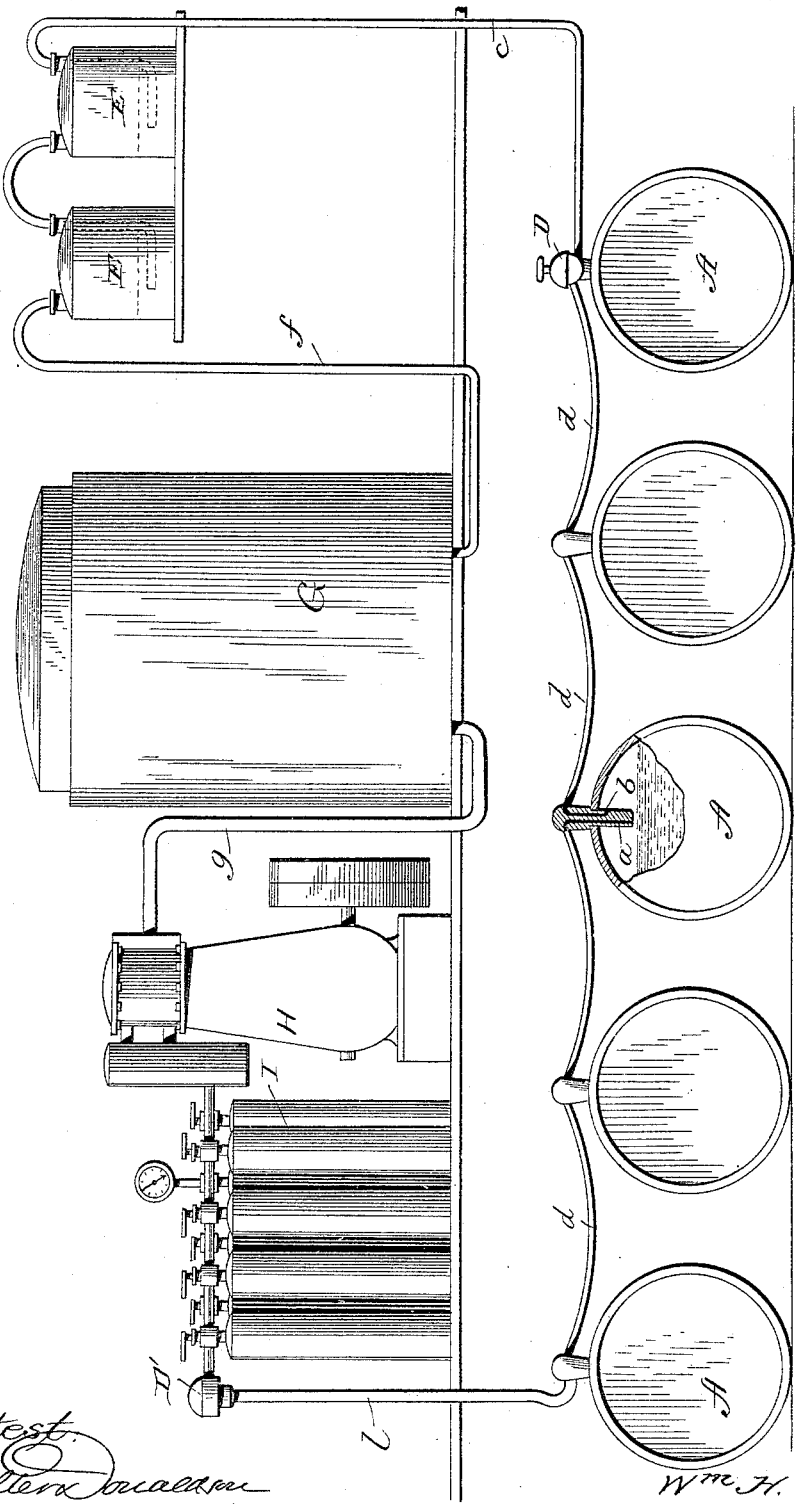

WILLIAM H. FOYE, OF CHICAGO, ILLINOIS.

APPARATUS FOR TREATING FERMENTED LIQUORS.

SPECIFICATION forming part of Letters Patent No. 445,168, dated January 27, 1891.

Application filed April 28, 1890. Serial No. 349,713. (No model.)

*To all whom it may concern:*

Be it known that I, WILLIAM H. FOYE, of Chicago, in the county of Cook and State of Illinois, have invented a new and useful Improvement in Apparatus for Treating Fermented Liquors; and I do hereby declare that the following is a full, clear, and exact description of the same.

The objects which I have in view in this invention are, first, to reduce the time now required for aging and ripening fermented liquors; second, to decompose a greater amount of albuminous substance in the liquor; third, to eliminate bacteria and yeast, and thereby to clarify and decrease the danger of deterioration of the liquor when it is subjected to a higher temperature; fourth, to restore to fermented liquor in the process of aging the aroma and flavor which otherwise may be lost in the escape of the carbonic gas, and to eliminate from the surplus gas the flavors of hops, so as to render such surplus available for the manufacture of carbonated drinks, and, in brief, I aim at the saving of time in the aging of fermented liquors, and, further, to economize the material to get the greatest possible result from all the constituents used in the manufacture of fermented liquors. The apparatus which I have designed for this purpose includes a complete circulation of the gases arising from a series of casks through said casks and through a purifier, a gasometer, and condensing-pump and compression-cylinders, coming back again to the first of the series of casks, whereby circulation may be maintained, as above stated, and whereby, also, gas from previous fermentation may be stored and applied to new liquors, so as to subject them at once to the full amount of pressure required without waiting for fermentation to generate that pressure in the casks which are to be subjected to the process, and whereby, also, an equal and constant pressure can be maintained upon every one of the series of casks and a constant circulation be kept up, either rapid or sluggish, as may be desired.

By this apparatus, also, I can maintain a current of gas of greater pressure and more rapid circulation in every one of the series of casks than that which would naturally rise out of the fermentation in individual casks, and this results in a more rapid and thorough fermentation, and consequently in a larger proportion of decomposed albuminoids and yeast-cells.

In the accompanying drawing the apparatus is shown in side elevation, with a series of casks in end view.

In the drawing the casks of the series are marked A. The head of one of them is broken away to show the bunging-tube extending to the interior of the cask, and has two independent passages $a$ $b$, the induction-passage $a$ leading down near to the surface of the liquor, while the eduction-passage $b$ is near the upper part of the barrel. In the bunging-tube of the last cask of the series, in the order of the circulation indicated by the arrow, is placed an automatic regulating-valve D, by means of which the pressure may be reduced as it passes into the tube $c$, which leads to the purifier. Between the casks are pipes $d$, which extend from the eduction-port of the bunging-tube of the preceding to the induction-port of the bunging-tube in the succeeding cask throughout the whole series. The purifiers are shown at E, and are of ordinary construction. I have shown two; but the number may be one or more. From the purifier a tube $f$ runs to the gasometer G, and from the gasometer, by a larger pipe $g$, connection is made with the compressing-pump H. This is arranged to exhaust from the gasometer and compress into a series or battery of storage-cylinders I. The number of cylinders may be varied; but I prefer to use several connected in succession, with stop-cocks between. They are made, preferably, about five inches in diameter and six feet in length, and of ordinary construction, to withstand the strain. They are thus adapted to hold about eight hundred gallons of gas at a pressure of six hundred pounds per square inch, at a temperature of 36° Fahrenheit. The battery is connected, as shown, in series of pipes, and the last cylinder is connected by a pipe $l$, through an automatic regulating-valve D', with the bunging-tube of the first cask on the induction side.

The apparatus above described is designed to be used in connection with the second fermentation of the liquor, which is carried on in what are called "shavings-casks." It is also adapted to use on inclosed vats, especially where the vacuum system is used in brewing.

I will now describe the new method of treating fermented liquor to be carried on by the apparatus which I have already described. I will suppose that the battery of compression-cylinders has been supplied by previous operation with a suitable amount of gas under pressure. The new liquor being in the cask A, and the connection being made, as described, the regulating-valve D' is set, for illustration, at eight pounds and the regulating-valve D at seven pounds. There will be what I call a "one-pound" current through the remainder of the circuit and seven-pounds pressure in each cask. This subjects the liquor in the casks at once to the full pressure, while at the same time circulation is kept up, the pressure and the circulation being of any desired amount.

It will be understood that the purifiers may be used or not, as may be desired. If they are used, the gas is purified and may be withdrawn from any one of the battery-cylinders and used for carbonated drinks, and it is also possible with the apparatus and this modification of the method to store in different tanks the product of each day's fermentation, which differs in quality, inasmuch as the oxygen decreases and the carbonic acid increases in quantity as the process of fermentation goes on.

I am aware that the general principle of circulation of carbonic-acid gas in fermenting liquors is not new, being shown in United States Patent No. 10,814, 1854, and I limit my claim accordingly.

I claim as my invention—

The apparatus described, consisting in the combination of a gasometer, a compression-pump, and a storage cylinder or cylinders, in connection with pipes and a regulating-valve, said pipes leading from the said storage cylinder or cylinders through a series of bunging-tubes having induction and eduction passages, a terminal regulating-valve, and pipes leading therefrom back to a gasometer, whereby circulation is kept up through the series of casks, all substantially as described.

In testimony whereof I have signed my name in the presence of two witnesses.

WILLIAM H. FOYE.

Witnesses:
GEO. W. CRAWFORD,
JOHN B. CRAWFORD.